US010496890B2

(12) United States Patent
Boss et al.

(10) Patent No.: US 10,496,890 B2
(45) Date of Patent: Dec. 3, 2019

(54) VEHICULAR COLLABORATION FOR VEHICULAR BLIND SPOT DETECTION

(71) Applicant: INTERNATIONAL BUSINESS MACHINES CORPORATION, Armonk, NY (US)

(72) Inventors: Gregory J. Boss, Saginaw, MI (US); John E. Moore, Jr., Brownsburg, IN (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 16 days.

(21) Appl. No.: 15/337,240

(22) Filed: Oct. 28, 2016

(65) Prior Publication Data
US 2018/0121740 A1 May 3, 2018

(51) Int. Cl.
| G06K 9/00 | (2006.01) |
| H04N 7/18 | (2006.01) |
| B60R 1/00 | (2006.01) |
| B60Q 9/00 | (2006.01) |
| B60T 7/22 | (2006.01) |
| B60T 8/17 | (2006.01) |

(52) U.S. Cl.
CPC ......... *G06K 9/00805* (2013.01); *B60Q 9/008* (2013.01); *B60R 1/00* (2013.01); *B60T 7/22* (2013.01); *B60T 8/17* (2013.01); *H04N 7/181* (2013.01); *B60R 2300/50* (2013.01); *B60R 2300/802* (2013.01); *B60T 2210/34* (2013.01)

(58) Field of Classification Search
None
See application file for complete search history.

(56) References Cited

U.S. PATENT DOCUMENTS

| 6,072,391 | A | 6/2000 | Suzuki et al. | |
| 7,202,776 | B2 | 4/2007 | Breed | |
| 7,552,012 | B2 | 6/2009 | Lehner | |
| 8,395,490 | B2 | 3/2013 | Yuda | |
| 8,704,679 | B2* | 4/2014 | Iyer | H04W 12/06 |
| | | | | 340/436 |
| 9,595,195 | B2* | 3/2017 | Varoglu | G08G 1/163 |
| 9,760,090 | B2* | 9/2017 | Shashua | G01C 21/32 |
| 2013/0073115 | A1* | 3/2013 | Levin | A61B 5/18 |
| | | | | 701/1 |
| 2013/0131908 | A1 | 5/2013 | Trepagnier et al. | |
| 2014/0168415 | A1 | 6/2014 | Ihlenburg et al. | |
| 2014/0302774 | A1* | 10/2014 | Burke | H04H 20/57 |
| | | | | 455/3.05 |

(Continued)

OTHER PUBLICATIONS

Unknown, "Device Warns Drivers of Objects in Rear," Best's Review, Dec. 2000 (1 page).

*Primary Examiner* — Thomas G Black
*Assistant Examiner* — Demetra R Smith-Stewart
(74) *Attorney, Agent, or Firm* — Griffiths & Seaton PLLC

(57) ABSTRACT

Embodiments for using vehicular collaboration for vehicular blind spot detection by a processor. A collaboration of images, capturing one or more non-visible areas to an occupant of a vehicle, may be received from a plurality of collaborative vehicles in substantially close proximity to the vehicle for aiding in determining an object in the one or more non-visible areas.

18 Claims, 8 Drawing Sheets

(56) References Cited

U.S. PATENT DOCUMENTS

| | | | |
|---|---|---|---|
| 2015/0023668 A1* | 1/2015 | Spaulding | H04B 10/1129 |
| | | | 398/106 |
| 2015/0025709 A1* | 1/2015 | Spaulding | G08G 1/163 |
| | | | 701/2 |
| 2015/0109444 A1* | 4/2015 | Zhang | B60Q 9/008 |
| | | | 348/148 |
| 2016/0001781 A1* | 1/2016 | Fung | B60W 40/08 |
| | | | 701/36 |
| 2016/0028824 A1* | 1/2016 | Stenneth | B60Q 9/008 |
| | | | 709/219 |
| 2016/0070527 A1 | 3/2016 | Ricci | |
| 2016/0189544 A1* | 6/2016 | Ricci | G07C 5/008 |
| | | | 701/117 |
| 2016/0357188 A1* | 12/2016 | Ansari | G05D 1/0212 |
| 2016/0379411 A1* | 12/2016 | Harbach | G06F 3/147 |
| | | | 345/633 |
| 2017/0039782 A1* | 2/2017 | Moeller | B60R 11/04 |

\* cited by examiner

VEHICULAR COLLABORATION FOR VEHICULAR BLIND SPOT DETECTION

BACKGROUND OF THE INVENTION

Field of the Invention

The present invention relates in general to computing systems, and more particularly to, various embodiments for using a vehicular collaboration system for vehicular blind spot detection of a vehicle by a processor.

Description of the Related Art

Vehicles of every kind, size, and energy consumption are prevalent in every aspect of today's society, as people are more mobile today than likely at any time in recorded history. Attendant with the proliferation of vehicles have been certain visual limitations associated with being an occupant in a vehicle, particularly if the vehicle is a larger sized vehicle, such as a sport utility vehicle (SUV). As one of ordinary skill in the art will appreciate, conventional vision aids enabling a driver to monitor the surroundings behind and to the side of a vehicle include externally-mounted side view mirrors and an internally-mounted rear view mirror. Mirror placement and shapes have been manipulated in attempts to minimize blind spots of the vehicle. Due to the many tradeoffs between mirror field of view, mounting locations, and interference by other solid vehicle structures, blind spots may still occur.

SUMMARY OF THE INVENTION

Various embodiments for a vehicular collaboration system for vehicular blind spot detection by a processor, are provided. In one embodiment, by way of example only, a method for using a vehicular collaboration system for vehicular blind spot detection by a processor is provided. A collaboration of images, video, sensor data, or other data, capturing one or more non-visible areas to an occupant of a vehicle, may be received from a plurality of collaborative vehicles in substantially close proximity to the vehicle for aiding in determining an object in the one or more non-visible areas.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
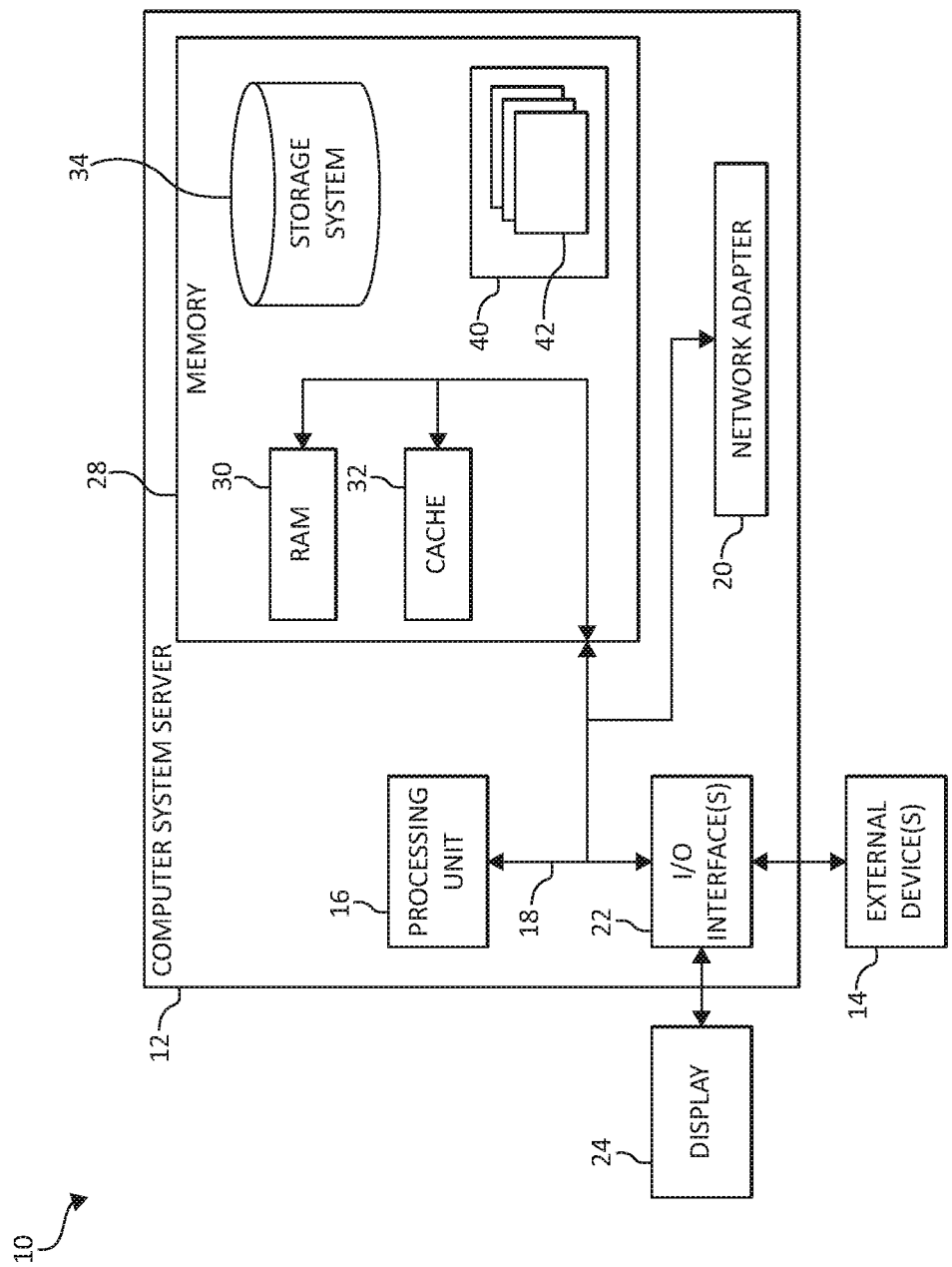
FIG. 1 is a block diagram depicting an exemplary computing node according to an embodiment of the present invention.

A common problem to the operators of motor vehicles is the difficulty in detecting other vehicles or objects in the "blind spots" of the vehicle's operator. Vehicle blind spots of vehicles may occur on either side of the vehicle such as, for example, an area starting at the driver and extending backwards towards the rear of the vehicle. Said differently, a blind spot may include the rear left of the operator's seat and a right-side blind spot extending outward from the rear right quadrant of the vehicle. Both of these blind spots are the source of numerous accidents when the driver makes a left or right turn or a left or right lane change. However, other blind spots may include areas directly behind or in front of each tire wheel, directly underneath the vehicle, in front of the vehicle, and/or in the back rear of the vehicle. In short, a vehicle's blind spot is that portion of the vehicle in which an object will not normally be observed by the use of the interior and exterior mirrors of the vehicle.

Thus, the mechanisms of the present invention use a vehicular collaboration system for vehicular blind spot detection. A collaboration of images, capturing one or more non-visible areas to an occupant of a vehicle, may be received from a plurality of collaborative vehicles in substantially close proximity to the vehicle for aiding in determining an object, hazard, or article in the one or more non-visible areas.

In one aspect, one or more cameras and sensors may be placed or located in a wheel-well of an automobile in order to determine if an object, hazard, or article is located in front of and/or behind the tire of an automobile. That is, one or more objects, hazards, and/or articles may be detected in front of and/or behind the tire of a vehicle using the vehicular collaboration system. One or more actions may be performed to avoid running over, striking, or hitting the object, hazard, or article.

A vehicular collaboration system may be employed as a "car-net" capturing one or more angles, views, and/or dimensions of the vehicle by using one or more cameras and/or sensor based devices of nearby, neighboring cars to alert the vehicle that an object or hazard is detected in a blind spot. The vehicular collaboration system may include using collaborative images, video, sounds, or other sensor-based device data via a social "car-net" through sharing of information. The collaborative data may be combined to form a 360-degree view of the vehicle capable of being displayed such as, for example, in a display system of the vehicle. A navigational route may be determined and presented in order for the vehicle to successfully and safely navigate and move around the object or hazard without striking, hitting, or going over the object, hazard, or article.

For example, a camera positioned and located, for example, on a wheel well, bumper, mirror, door, of one or more nearby or alternative vehicles associated with the vehicular collaboration system, may capture an under carriage view of a target vehicle's blind spot. The images of the under carriage view of another vehicle's blind spot may be collected, analyzed, and distributed to the target vehicle. The target vehicle may be prevented or stopped from moving forward or backwards over the object. A notification system may alert and alarm the occupant or driver of the target vehicle (and also all vehicles associated with the vehicular collaboration system) of the detected object, hazard, or article. The target vehicle may be enabled to safely navigate around the detected object, hazard, or article without running over it, striking, and/or hitting the detected object, hazard, or article using the cameras and sensors on the automobile and that of neighboring automobiles in a "car-net" arrangement. In short, if the collaboration of images, video, or other sensor data, capturing one or more non-visible areas to an occupant of a vehicle, received from one or more collaborative vehicles in the vehicular collaboration system detects an object, hazard, or article in the one or more non-visible areas, the ability for the target vehicle to move, operate, or function may be disabled.

Additional aspects of the present invention and attendant benefits will be further described, following.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in a moving vehicle. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
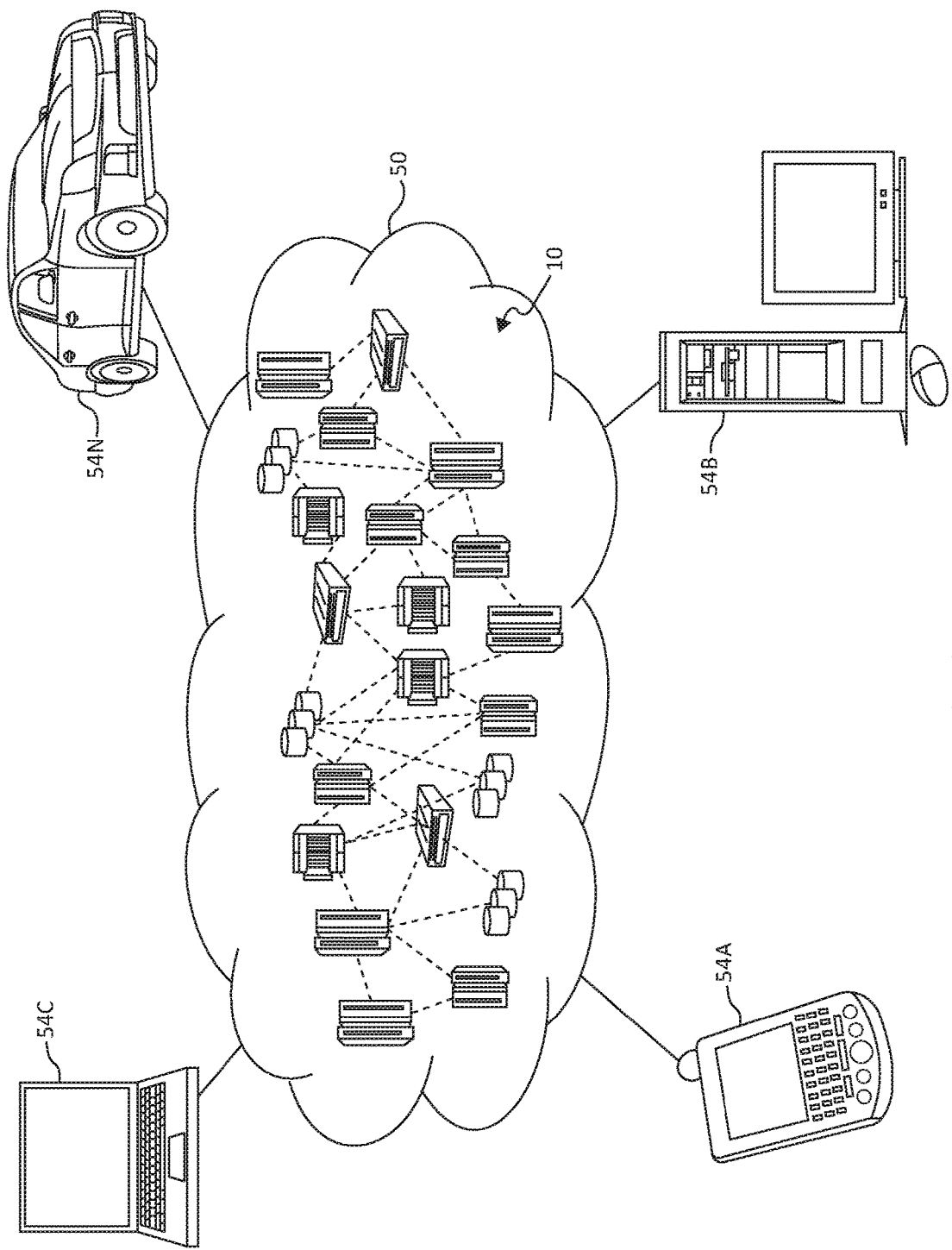
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
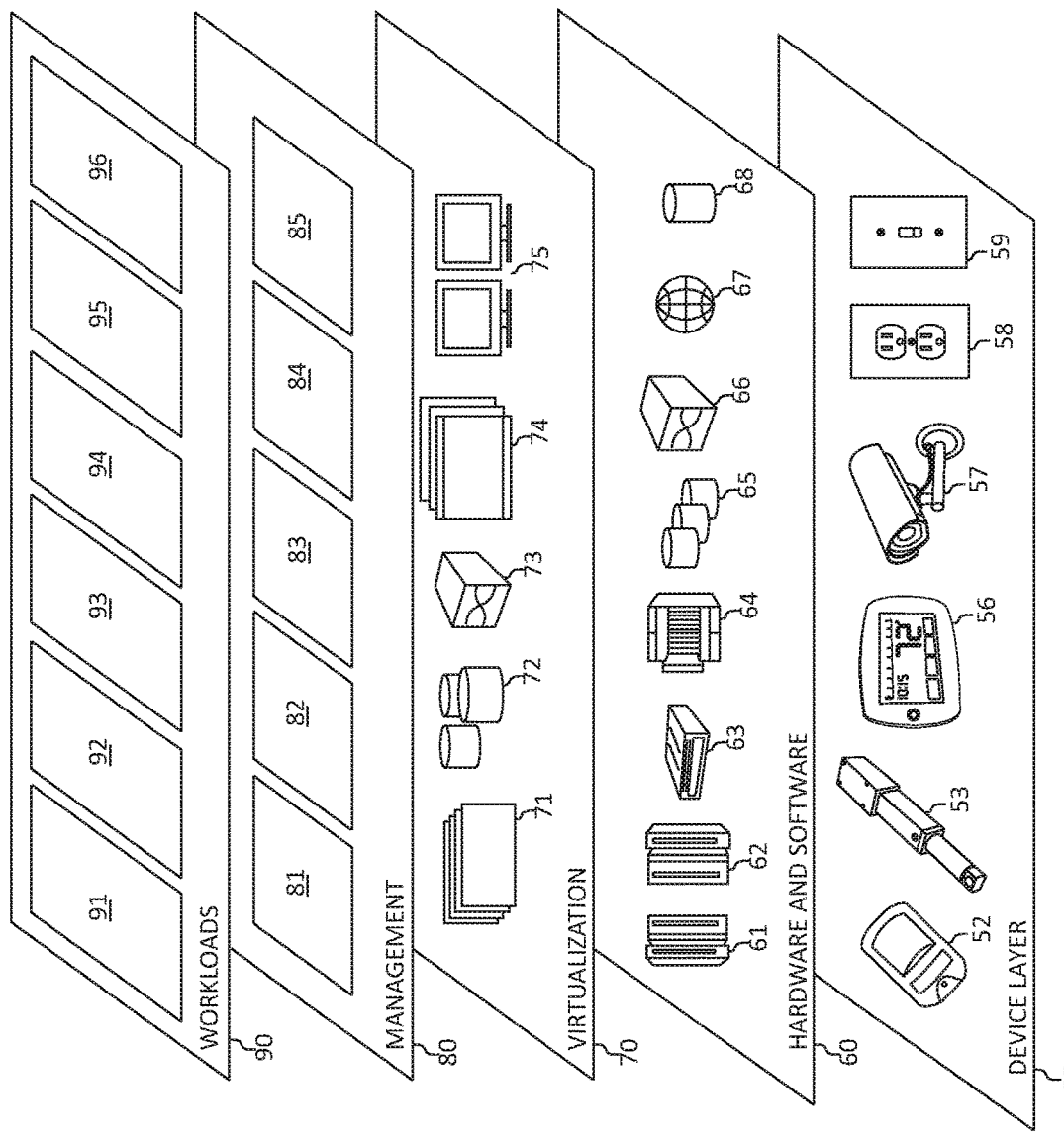
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various vehicular collaboration and vehicular blind spot detection workloads and functions 96. In addition, vehicular collaboration and vehicular blind spot detection workloads and functions 96 may include such operations as data analysis (including data collection and processing from various environmental sensors), collaborative data analysis, and predictive data analytics functions. One of ordinary skill in the art will appreciate that the vehicular collaboration and vehicular blind spot detection workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
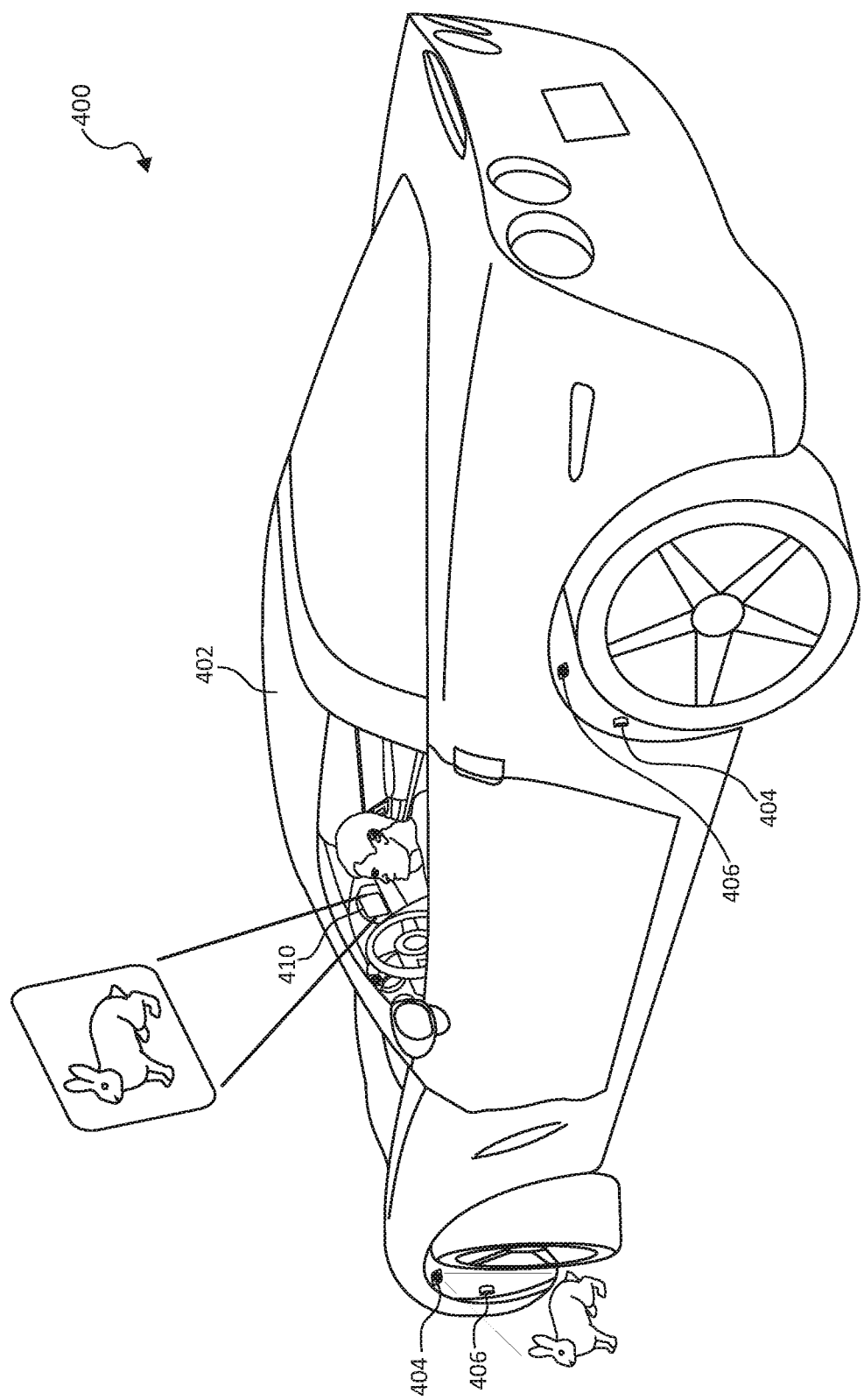
FIG. 4 is an additional block diagram depicting various user hardware and computing components functioning in accordance with aspects of the present invention.

Turning to FIG. 4, a block diagram of various hardware 400 including a vehicle 402 equipped with various functionality as will be further described is shown in which aspects of the mechanisms of the illustrated embodiments may be realized. Vehicle 402 may be driven by an occupant and/or by using self-driving technology (e.g., autopilot). A variety of IoT devices, such as cameras 404 (including UV/thermal cameras and the like) and sensor devices 406 (e.g., audio input devices, recording devices, temperature sensors, atmospheric sensors, biological sensors, or other sensor devices to record or broadcast a wide variety of data) may be installed in or around the vehicle 402.

In one embodiment, the various cameras 404 and sensors 406 associated with the vehicle 402 may be monitored over time (e.g., in real time over a period of time). Certain data may be obtained from the respective cameras and sensor devices, such as one or more areas that may be non-visible to an occupant (e.g., driver) of the vehicle 402. In this manner, the cameras 404 and sensors 406 may capture an object, hazard, or article located within a blind spot (e.g., the non-visible area of an occupant in a target vehicle) and display the field of view and notification/alerts on a display system 410, such a vehicle's display device located inside the vehicle that is viewable to an occupant of the vehicle. For example, an object, such as an animal or small toy, located in front of a front tire of the vehicle may be detected and displayed in the display system 410. The vehicle 402 may use one or more IoT devices, such as sensors 406 to broadcast an audible tone, sound, or speech toward a detected object and/or within the vehicle. For example, a loud alarm may repeatedly sound until the object is no longer detected.

Figure 5:
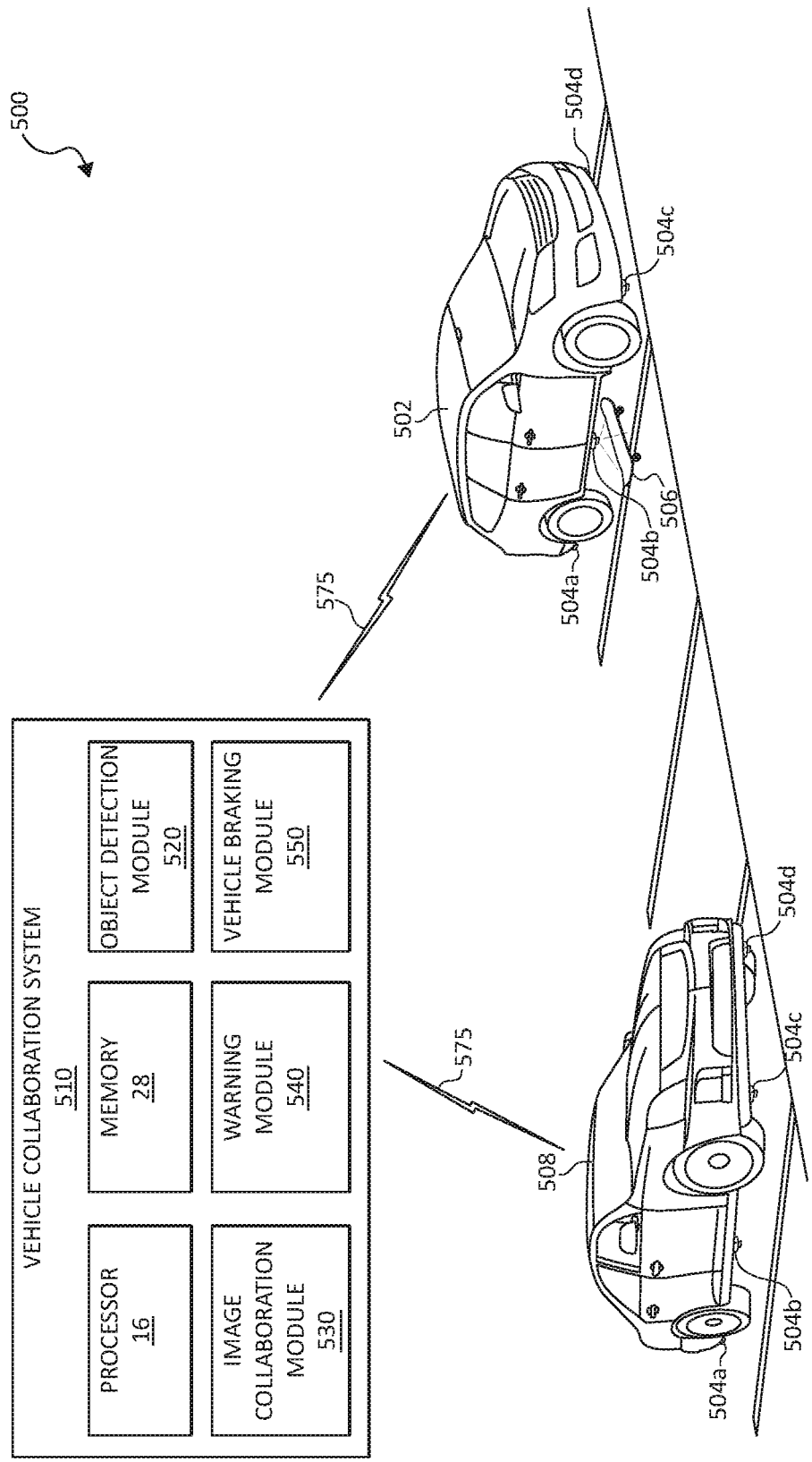
FIG. 5 is a block diagram of exemplary hardware structures when used in combination with the processing components of the present invention, effecting various mechanisms of the illustrated embodiments.

Turning to FIG. 5, a block diagram of various hardware 500 equipped with various functionality as will be further described is shown in which aspects of the mechanisms of the illustrated embodiments may be realized. In one aspect, one or more of the components, modules, services, applications, and/or functions described in FIGS. 1-4 may be used in FIG. 5.

For example, computer system/server 12 of FIG. 1 may be included in FIG. 5 and may be connected to other computing nodes (such as computer systems of vehicles) over a distributed computing network, where additional data collection, processing, analytics, and other functionality may be realized. The computer system/server 12 of FIG. 1, may include a vehicle collaboration system 510, along with other related components in order to analyze and detect the object, hazard, or article identified in/by the images, videos, sensor data, or a combination thereof collected from the cameras or from the one or more sensors.

In one embodiment, the vehicular collaboration system 510 may be in communication via network or communication link 575 with one or more vehicles such as, for example, vehicle 502 and 508. In one aspect, the vehicular collaboration system 510 may be an independent computing service provided by one or more computing systems and servers (not show for illustrative convenience but may be included in one or more components, modules, services, applications, and/or functions of FIGS. 1-4) and external to the vehicles 502 and 508. In an additional embodiment, the vehicular collaboration system 510 may be located and installed within one or more vehicles such as, for example, vehicles 502 and 508. Vehicles 502 and 508 may be associated with the vehicle collaboration system 510 via one or more pre-authorization operations and/or may be instantaneously joined to the vehicular collaboration system 510 via a series of authentication operations to join and grant permission to the vehicular collaboration system 510 to gain accesses to one or more IoT devices and/or computing systems of vehicles 502 and 508 for sharing the collaborative data.

More specifically, the vehicular collaboration system 510 may incorporate processing unit 16 ("processor") and memory 28 of FIG. 1, for example, to perform various computational, data processing and other functionality in accordance with various aspects of the present invention. The vehicular collaboration system 510 may also include an object detection module 520, image collaboration module 530, warning module 540, and vehicle braking module 550, each of which may be controlled and in communication with processing unit 16 and memory 28.

Each vehicle 502 and 508 may have installed thereon one or more internet of things (IoT) devices, such as cameras and sensor based devices (e.g., biometric sensors) 504a-d to gather data surrounding the vehicle or nearby vehicles, such as images, motions, sounds, or other environmental data. Each of the IoT devices may capture the one or more non-visible areas (and visible areas) of the vehicle from the devices 504a-d mounted to each of the vehicles 502 and 508. Each of the captured images may be included in a collaboration of images.

In general, the vehicle collaboration system 510 may receive a collaboration of images, videos, data, sounds, biological data, signals, and/or a combination thereof capturing one or more non-visible areas to an occupant of a vehicle, such as target vehicle 502, from one or more IoT devices 504a-d located on each one of a plurality of collaborative vehicles, such as vehicles 502 and/or 508, in substantially close proximity to the target vehicle 502, for aiding in determining an object in the one or more non-visible areas of target vehicle 502.

For example, the processing component 16 may determine, from captured data from the one or more IoT devices 504a-d, an object 506, such as an animal or small toy, located in front of a rear tire of the vehicle. In addition, the processing component 16 may send one or more signals to other computing or control components of the vehicle collaboration system 510 to trigger a braking action to prevent the vehicle, such as vehicle 502, from moving. One of ordinary skill in the art will appreciate that additional factors, such as the vehicle's position, size, or computing technology included on the vehicle 502 (e.g., self-driving or "auto-pilot" functionality), and other factors may be observed and/or determined from vehicle sources or sources available through a distributed computing environment that may be used to assist with receiving a collaboration of images, videos, or other sensor data from one or more IoT devices 504a-d capturing one or more non-visible areas to an occupant of a vehicle from one or more collaborative vehicles, such as vehicle 508, in substantially close proximity to the target vehicle 502 (e.g., less than 500 feet from the vehicle) for aiding in determining an object in the one or more non-visible areas.

The various cameras and sensors, such as devices 504a-d, associated with the vehicle 502 or 508 may monitor the vehicle 502 or 508 over a selected time period (e.g., in real time) upon activation of the vehicle collaboration system 510. Certain data may be obtained from the respective cameras and sensor devices 504a-d, such as one or more areas that may be non-visible to an occupant (e.g., driver) of the vehicle 502. In this manner, the camera and sensors 504a-d may capture the object 506, such as a skateboard, or other hazard, within a blind spot (e.g., the non-visible area to the occupant of the vehicle).

The image collaboration module 530 may request access to the collaborative vehicles, such as vehicle 502 or 508, in substantially close proximity to one of the vehicles, such as vehicle 502 or 508, for receiving an image from each imaging or sensing devices associated with the vehicles 502 and 508, wherein each received image is included in the collaboration of images. Upon receiving permission to access the cameras and sensor based devices 504a-d of each of the vehicles 502 and 508 in the vehicle collaboration system 510, the image collaboration module 530 may collect, gather, and process the data received from each of the respective cameras and sensor devices 504a-d from vehicles 502 and/or 508.

The object detection module 520 may use the processed data from the image collaboration module 530 to detect the object, hazard, or article in the blind spot (e.g., the non-visible area to the occupant of the vehicle), such as object 506. More specifically, the object detection module 520 may detect the object, hazard, or article in the one or more non-visible areas using the collaboration of images (e.g., collaboration of data) received from one or more of the devices 504a-d.

The warning module 540 may be signaled to provide an alert or an alarm. The warning module 540 may provide a notification to the vehicle upon detecting the object 506 in the one or more non-visible areas. The warning module 540 may broadcast an audible alert via a speaker device associated with the vehicle. The warning module 540 may also provide an alternative route to enable the vehicle to circumvent the object 506 in the one or more non-visible areas.

For example, in one aspect, the warning or alert may be displayed within one or more graphical user interfaces (GUI), displays systems, and/or navigational systems of the vehicle. Alternatively, the warning module 540 may signal a device such as, devices 504*a-c*, which may be a microphone, to broadcast an alert, sound, alarm, or audible command towards the direction of the detected object, hazard, or article detected in the blind spot. For example, a microphone located on or near a wheel-well, such as the right front wheel-well, may receive a signal or alarm to broadcast in the direction of the object, such as a small animal or child.

The vehicle braking module 550 may also assist in preventing an anticipated movement of the vehicle upon detecting the object 506 in the one or more non-visible areas. For example, the vehicle braking module 550 may signal one or more computing systems, such as a computing or control system of a vehicle responsible for breaking or stopping, to cause a braking force to the vehicle to terminate a forward motion or a rearward motion of the vehicle upon detecting the object in the one or more non-visible areas. In one aspect, the vehicle braking module 550 itself may signal one or more mechanical systems of the vehicle to cause the braking force to stop the vehicle or prevent movement of the vehicle. Moreover, the vehicle braking module 550 may also signal or direct additional control systems of the vehicle, such as vehicle 502 or 508, to terminate the operation of an engine or transmission, cease power to the transmission, and/or temporarily disengage the transmission from forward or rearward operation to a neutral or park position.

Figure 6:
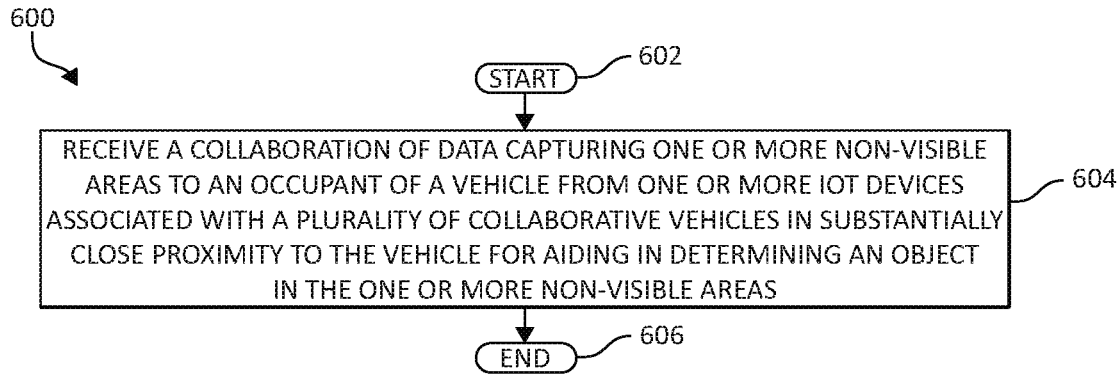
FIG. 6 is a flowchart diagram of an exemplary method for using vehicular collaboration for vehicular blind spot detection by a processor, in which various aspects of the present invention may be realized.

Turning now to FIG. 6, a method 600 for using vehicular collaboration for vehicular blind spot detection by a processor is depicted, in which various aspects of the illustrated embodiments may be implemented. That is, FIG. 6 is a flowchart of an additional example method 600 for using vehicular collaboration for vehicular blind spot detection in a computing environment according to an example of the present invention. The functionality 600 may be implemented as a method executed as instructions on a machine, where the instructions are included on at least one computer readable medium or one non-transitory machine-readable storage medium. The functionality 600 may start in block 602. A collaboration of data (e.g., images, video data, audio data, sensor based device data, or a combination thereof) capturing one or more non-visible areas to an occupant of a vehicle from one or more IoT devices associated with a plurality of collaborative vehicles in substantially close proximity to the vehicle, may be received for aiding in determining an object in the one or more non-visible areas, as in block 604. The functionality 600 may end, as in block 606. Various internal environmental controls may also be adjusted or signaled to assist in each of the operations associated with the vehicular collaboration for vehicular blind spot detection as described herein.

In one aspect, in conjunction with and/or as part of at least one block of FIG. 6, the operations of 600 may include each of the following. The operations of 600 may request access to the plurality of collaborative vehicles in substantially close proximity to the vehicle for receiving a one or more images, audio data, video stream, sensor based device data, or combination thereof from each imaging or sensing devices associated with the plurality of vehicles, wherein the one or more images, the audio data, the video stream, the sensor based device data, or combination thereof are included in the collaboration of data.

The operations of 600 may capture the one or more non-visible (and/or visible areas) of the vehicle from one or more cameras or sensor based devices mounted to the vehicle, wherein the captured one or more non-visible areas are included in the collaboration of data. An object may be detected in the one or more non-visible areas using a collaboration of images or video streams.

The operations of 600 may prevent an anticipated movement of the vehicle upon detecting the object in the one or more non-visible areas or a braking force to the vehicle to terminate a forward motion or a rearward motion of the vehicle upon detecting the object in the one or more non-visible areas. A notification may be provided to the vehicle upon detecting the object in the one or more non-visible areas. An audible alert may be broadcasted via a speaker device associated with the vehicle. An alternative route may be determined to enable the vehicle to circumvent the object in the one or more non-visible areas. The operations of 600 may display, in real time, the collaboration of images, video, sounds, sensor based data, or a combination thereof in a display of the vehicle.

Figure 7:
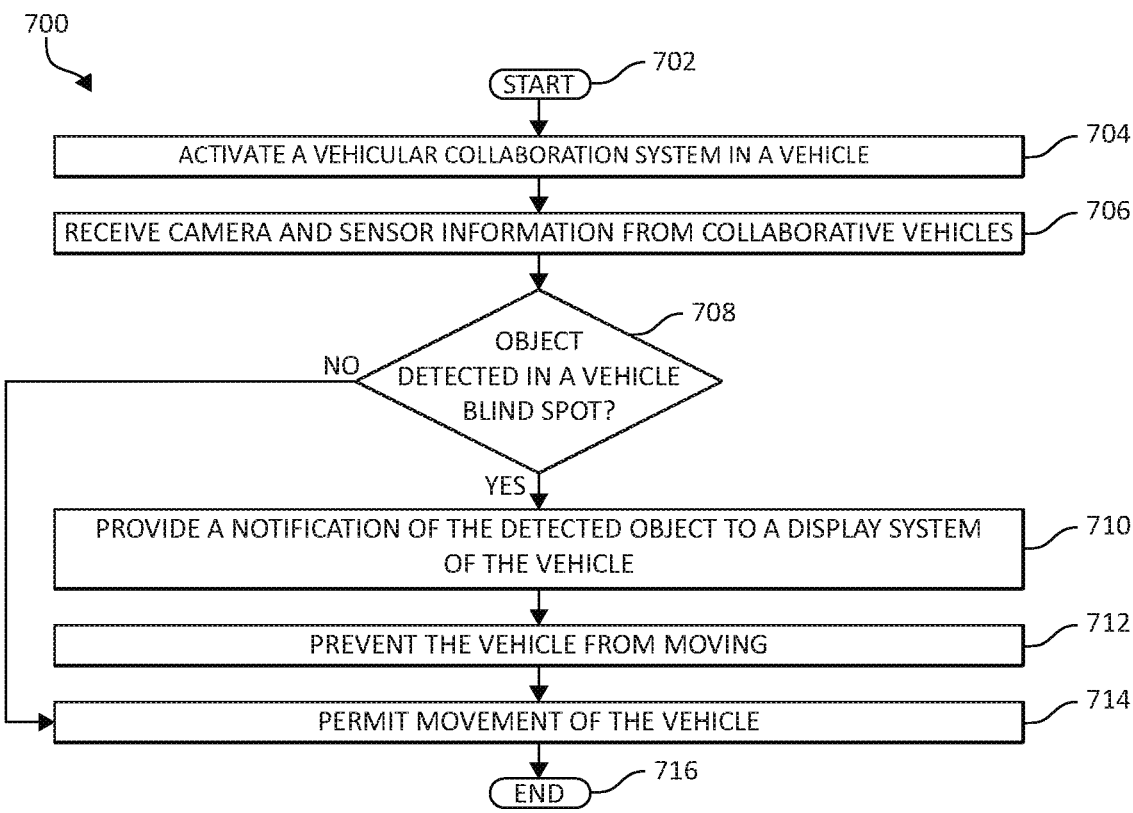
FIG. 7 is a flowchart diagram of an additional exemplary method for using vehicular collaboration for vehicular blind spot detection by a processor, in which various aspects of the present invention may be realized.

Turning now to FIG. 7, a method 700 for using vehicular collaboration for vehicular blind spot detection by a processor is depicted, in which various aspects of the illustrated embodiments may be implemented. That is, FIG. 7 is a flowchart of an additional example method 700 for using vehicular collaboration for vehicular blind spot detection in a computing environment according to an example of the present invention. The functionality 700 may start in block 702. A vehicular collaboration system may be activated in a vehicle, as in block 704. Camera and/or sensor information may be received from one or more collaborative vehicles, as in block 706. If, as in block 708, based on the camera and/or sensor information, an object is detected in a vehicle blind spot, the functionality 700 may move to block 710 to provide a notification of the detected object to a display system of the vehicle. The vehicle may be prevented from moving, as in block 712. As part of block 712, one or more signals may be communicated to one or more systems of the vehicle to trigger a braking or stopping mechanism of the vehicle to brake or stop the vehicle. Returning to block 708, if there are no objects detected in a vehicle blind spot, the functionality 700 may move to block 714 to permit movement of the vehicle. The functionality 700 may end, as in block 716.

Figure 8:
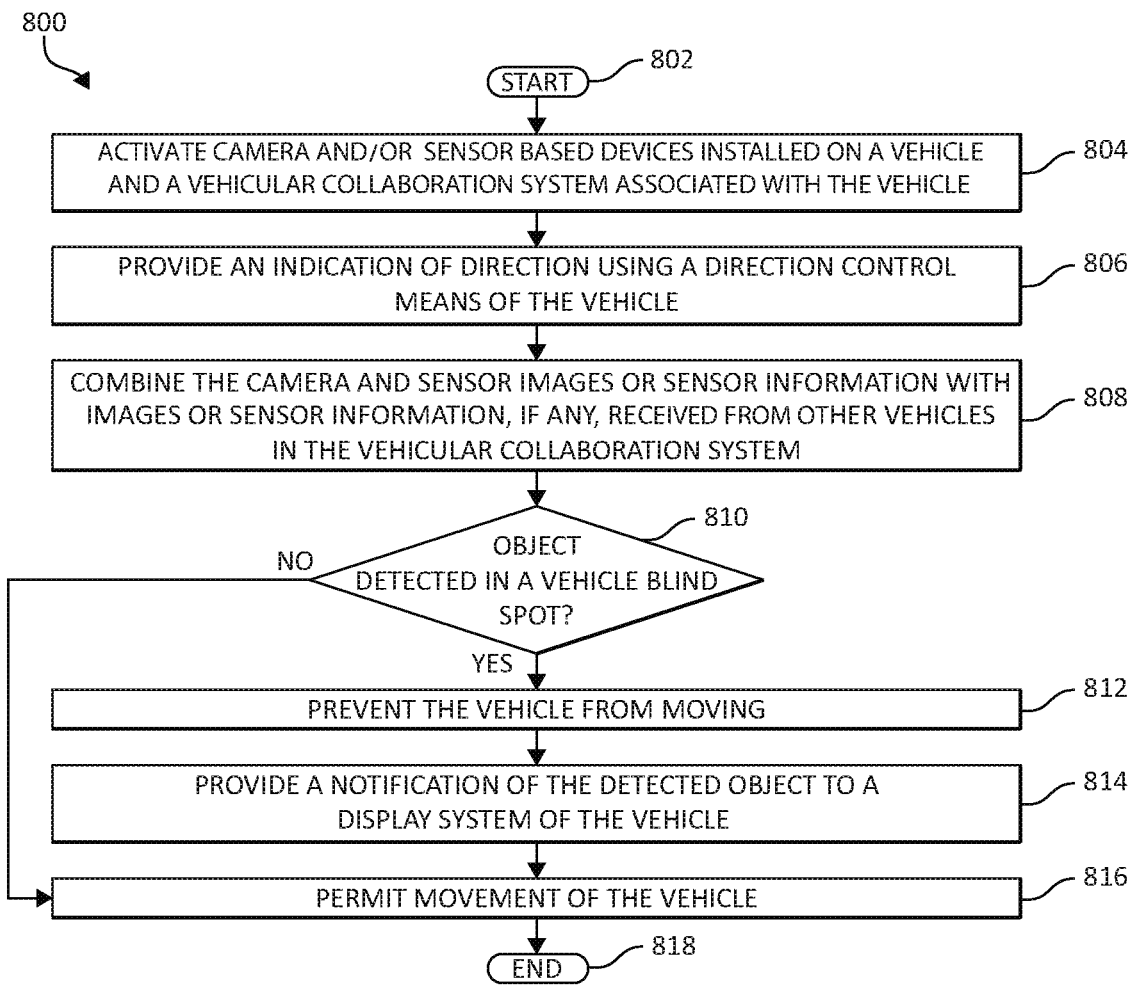
FIG. 8 is an additional flowchart diagram of an additional exemplary method for using vehicular collaboration for vehicular blind spot detection in a vehicle by a processor, here again in which various aspects of the present invention may be realized.

Turning now to FIG. 8, a method 800 for vehicular blind spot detection using devices of a vehicle along with vehicular collaboration information by a processor is depicted, in which various aspects of the illustrated embodiments may be implemented. The functionality 800 may start in block 802. Camera and/or sensor based devices, installed on a vehicle, and a vehicular collaboration system, associated with the vehicle, may be activated, as in block 804. An indication of direction may be determined using a direction control means of the vehicle, as in block 806. Camera and sensor information of the vehicle may be combined with images or sensor information, if any, received from other vehicles associated with the vehicular collaboration system, as in block 808.

If, as in block 810, based on the camera and/or sensor information of the vehicle and the vehicular collaboration images/information, an object is detected in a vehicle blind spot, the functionality 800 may move to block 812 to prevent the vehicle from moving. As part of block 812, one or more signals may be communicated to one or more systems of the vehicle to trigger a braking or stopping mechanism of the vehicle to brake or stop the vehicle. A notification of the detected object may be provided to a display system of the vehicle, as in block 814. The vehicle may be prevented from moving until the notification is acknowledged, dismissed, and/or deleted following a selected time period.

Returning to block 810, if there are no objects detected in a vehicle blind spot, the functionality 800 may move to block 816 to permit movement of the vehicle. The functionality 800 may end, as in block 818.

Figure 9:
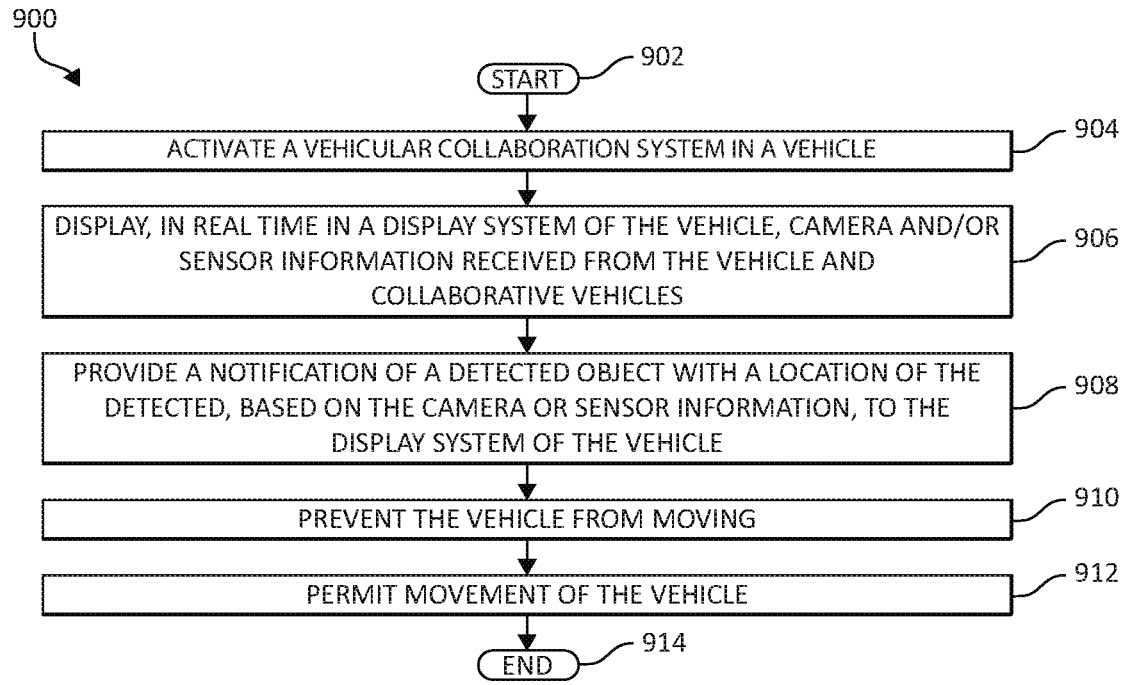
FIG. 9 is an additional flowchart diagram of an additional exemplary method for vehicular blind spot detection using devices of a vehicle along with vehicular collaboration information in a vehicle by a processor, here again in which various aspects of the present invention may be realized.

Turning now to FIG. 9, a method 900 for preventing a vehicle from hitting an object detected in a vehicular blind spot by a processor is depicted, in which various aspects of the illustrated embodiments may be implemented. The functionality 900 may start in block 902. A vehicular collaboration system may be activated in a vehicle, as in block 904. Images and/or sensor device information received from collaborative vehicles associated with the vehicular collaboration system may be displayed in real time in a display system of the vehicle, as in block 906. A notification of the detected object may be provided to a display system of the vehicle with an indication of the location of the detected object (e.g., "the skateboard is in front of the right front tire"), as in block 908.

The vehicle may be prevented from moving, as in block 910. That is, the notification of the detected object may be issued to one or more computing systems of a targeted vehicle to control movement of the vehicle, execute a braking operation of the vehicle, prevent the vehicle from moving forward or in reverse, or a combination thereof. For example, upon the vehicular collaboration system sending a notification to the vehicle, a signal may also be sent to one or more systems, such as a braking control system of the vehicle, to trigger a braking movement to prevent the vehicle from moving. Alternatively, a signal may also be sent to another control system of the vehicle which may also terminate power, energy, and/or resources controlling an engine, transmission, or system associated with the engine or transmission, of the vehicle (e.g., a shutdown operation is performed and transmission, engine, and/or power systems of the vehicle may shut down). The vehicle may be prevented from moving and/or restarting until the notification has been removed or canceled on the display system. The functionality 900 may move to block 912 to permit movement of the vehicle (after the notification has been dismissed). The functionality 900 may end, as in block 914.

Figure 10:
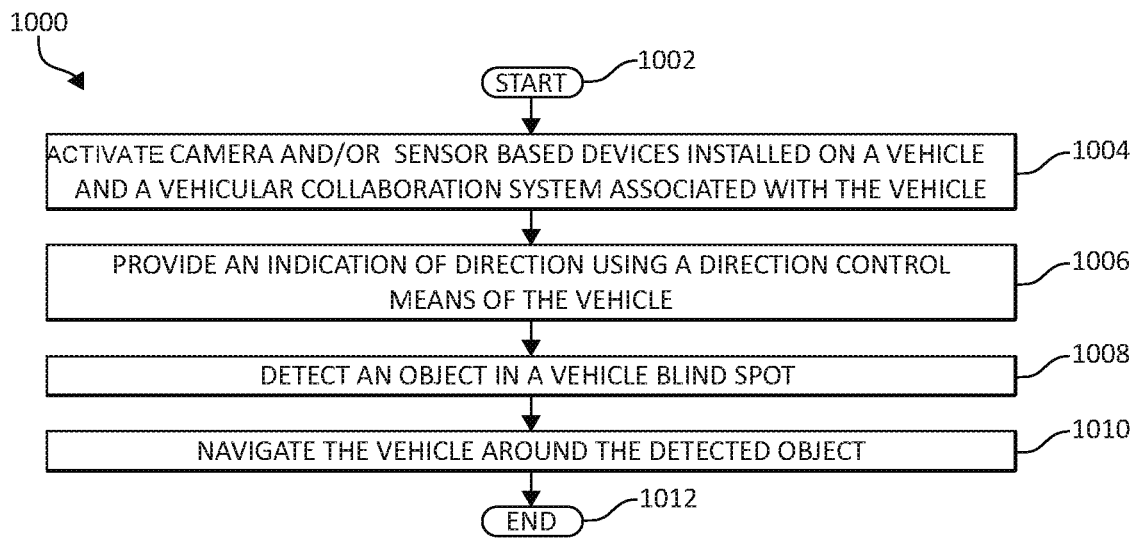
FIG. 10 is an additional flowchart diagram of an additional exemplary method for vehicular blind spot detection using devices of a vehicle along with a vehicular collaboration system by a processor, here again in which various aspects of the present invention may be realized.

Turning now to FIG. 10, a method 1000 for vehicular blind spot detection using devices of a vehicle along with a vehicular collaboration system by a processor is depicted, in which various aspects of the illustrated embodiments may be implemented. That is, FIG. 10 is a flowchart of an additional example method 1000 for vehicular blind spot detection using devices of a vehicle along with the vehicular collaboration system in a computing environment according to an example of the present invention. The functionality 1000 may start in block 1002. Camera and/or sensor based devices, installed on a vehicle, and the vehicular collaboration system associated with the vehicle, may be activated, as in block 1004. An indication of a direction of the vehicle may be provided using a direction control means of the vehicle, as in block 1006. An object may be detected in a blind spot of the vehicle, as in block 1008. That is, the camera and/or sensor based devices of the vehicle and/or the vehicular collaboration information received from one or more vehicles associated with a vehicular collaboration system may be gathered and analyzed to both detect and determine a size, width, and height of the detected object. Using one or more computing systems of the vehicle, such as a self-parking and/or self-driving ("autopilot") system, the vehicle may be enabled, using the information about the detected object, to navigate, move, and circumvent around the detected object without striking the detected object, as in block 1010. The functionality 1000 may end, as in block 1012.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by a processor, for using vehicular collaboration for vehicular blind spot detection, comprising:

receiving a collaboration of data capturing one or more non-visible areas to an occupant of a vehicle from one or more devices of a plurality of collaborative vehicles in substantially close proximity to the vehicle for aiding in determining an object in the one or more non-visible areas;

requesting access to the plurality of collaborative vehicles in substantially close proximity to the vehicle by initiating a series of authentication operations to thereby join the vehicle to a network of the plurality of collaborative vehicles for receiving a one or more images, audio data, video stream, sensor based device data, or combination thereof from each imaging or sensing device associated with the plurality of vehicles, wherein the one or more images, the audio data, the video stream, the sensor based device data, or combination thereof are included in the collaboration of data to facilitate detection of the object such that, upon detection of the object in the one or more non-visible areas, at least one of a plurality of avoidance actions are performed to assist the vehicle in avoiding the object; wherein detecting the object further includes determining, using the collaboration of data, a height, width, and size of the object such that respective ones of the imaging or sensing devices associated with the collaborative vehicles are used in conjunction with one another to determine the height, width, and size of the object; and wherein one of the at least one of the plurality of avoidance actions includes using the determined height, width, and size of the object to self-navigate the vehicle around the object to avoid contacting the object with the vehicle; and providing a notification to a display within the vehicle upon detecting the object in the one or more non-visible areas; wherein vehicle movement is prohibited by a powertrain of the vehicle until a confirmation of dismissal of the notification is received from a user.

2. The method of claim 1, further including capturing the one or more non-visible areas of the vehicle from one or more camera or sensor based devices mounted to the vehicle, wherein the captured one or more non-visible areas are included in the collaboration of data.

3. The method of claim 1, further including detecting the object in the one or more non-visible areas using a collaboration of images or video stream.

4. The method of claim 1, further including:

preventing an anticipated movement of the vehicle upon detecting the object in the one or more non-visible areas; or causing a braking force to the vehicle to terminate a forward motion or a rearward motion of the vehicle upon detecting the object in the one or more non-visible areas.

5. The method of claim 1, further including:

broadcasting an audible alert via a speaker device associated with the vehicle; or determining an alternative route to enable the vehicle to circumvent the object in the one or more non-visible areas.

6. The method of claim 1, further including displaying in real time the collaboration of data in a display of the vehicle.

7. A system for using vehicular collaboration for vehicular blind spot detection, comprising:

a processor, operable to receive input from a vehicular collaboration environment, that:

receives a collaboration of data capturing one or more non-visible areas to an occupant of a vehicle from a plurality of collaborative vehicles in substantially close proximity to the vehicle for aiding in determining an object in the one or more non-visible areas;

requests access to the plurality of collaborative vehicles in substantially close proximity to the vehicle by initiating a series of authentication operations to thereby join the vehicle to a network of the plurality of collaborative vehicles for receiving a one or more images, audio data, video stream, sensor based device data, or combination thereof from each imaging or sensing device associated with the plurality of vehicles, wherein the one or more images, the audio data, the video stream, the sensor based device data, or combination thereof are included in the collaboration of data to facilitate detection of the object such that, upon detection of the object in the one or more non-visible areas, at least one of a plurality of avoidance actions are performed to assist the vehicle in avoiding the object; wherein detecting the object further includes determining, using the collaboration of data, a height, width, and size of the object such that respective ones of the imaging or sensing devices associated with the collaborative vehicles are used in conjunction with one another to determine the height, width, and size of the object; and wherein one of the at least one of the plurality of avoidance actions includes using the determined height, width, and size of the object to self-navigate the vehicle around the object to avoid contacting the object with the vehicle; and provides a notification to a display within the vehicle upon detecting the object in the one or more non-visible areas; wherein vehicle movement is prohibited by a powertrain of the vehicle until a confirmation of dismissal of the notification is received from a user.

8. The system of claim 7, wherein the processor captures the one or more non-visible areas of the vehicle from one or more camera or sensor based devices mounted to the vehicle, wherein the captured one or more non-visible areas are included in the collaboration of data.

9. The system of claim 7, wherein the processor detects the object in the one or more non-visible areas using a collaboration of images or video stream.

10. The system of claim 7, wherein the processor:
prevents an anticipated movement of the vehicle upon detecting the object in the one or more non-visible areas; or
causes a braking force to the vehicle to terminate a forward motion or a rearward motion of the vehicle upon detecting the object in the one or more non-visible areas.

11. The system of claim 7, wherein the processor:
broadcasts an audible alert via a speaker device associated with the vehicle; or
determines an alternative route to enable the vehicle to circumvent the object in the one or more non-visible areas.

12. The system of claim 7, wherein the processor displays in real time the collaboration of data in a display of the vehicle.

13. A computer program product for using vehicular collaboration for vehicular blind spot detection by a processor, the computer program product comprising a non-transitory computer-readable storage medium having computer-readable program code portions stored therein, the computer-readable program code portions comprising:

an executable portion that receives a collaboration of data capturing one or more non-visible areas to an occupant of a vehicle from a plurality of collaborative vehicles in substantially close proximity to the vehicle for aiding in determining an object in the one or more non-visible areas;

an executable portion that requests access to the plurality of collaborative vehicles in substantially close proximity to the vehicle by initiating a series of authentication operations to thereby join the vehicle to a network of the plurality of collaborative vehicles for receiving a one or more images, audio data, video stream, sensor based device data, or combination thereof from each imaging or sensing device associated with the plurality of vehicles, wherein the one or more images, the audio data, the video stream, the sensor based device data, or combination thereof are included in the collaboration of data to facilitate detection of the object such that, upon detection of the object in the one or more non-visible areas, at least one of a plurality of avoidance actions are performed to assist the vehicle in avoiding the object; wherein detecting the object further includes determining, using the collaboration of data, a height, width, and size of the object such that respective ones of the imaging or sensing devices associated with the collaborative vehicles are used in conjunction with one another to determine the height, width, and size of the object; and wherein one of the at least one of the plurality of avoidance actions includes using the determined height, width, and size of the object to self-navigate the vehicle around the object to avoid contacting the object with the vehicle; and an executable portion that provides a notification to a display within the vehicle upon detecting the object in the one or more non-visible areas; wherein vehicle movement is prohibited by a powertrain of the vehicle until a confirmation of dismissal of the notification is received from a user.

14. The computer program product of claim 13, further including an executable portion that captures the one or more non-visible areas of the vehicle from one or more camera or sensor based devices mounted to the vehicle, wherein the captured one or more non-visible areas are included in the collaboration of data.

15. The computer program product of claim 13, further including an executable portion that detects the object in the one or more non-visible areas using a collaboration of images or video stream.

16. The computer program product of claim 13, further including an executable portion that:
prevents an anticipated movement of the vehicle upon detecting the object in the one or more non-visible areas; or
causes a braking force to the vehicle to terminate a forward motion or a rearward motion of the vehicle upon detecting the object in the one or more non-visible areas.

17. The computer program product of claim 13, further including an executable portion that:
broadcasts an audible alert via a speaker device associated with the vehicle; or
determines an alternative route to enable the vehicle to circumvent the object in the one or more non-visible areas.

18. The computer program product of claim 13, further including an executable portion that displays in real time the collaboration of data in a display of the vehicle.

\* \* \* \* \*